Patented Mar. 30, 1937

2,075,543

UNITED STATES PATENT OFFICE 2,075,543

STABILIZATION OF VINYL RESINS AND COMPOSITIONS PRODUCED THEREBY

Marion C. Reed and Frazier Groff, Lakewood, Ohio, assignors, by mesne assignments, to Union Carbide and Carbon Corporation, a corporation of New York No Drawing. Application July 10, 1934, Serial No. 734,508

12 Claims. (Cl. 260—2)

The present invention relates to the production of both heat- and light-stable synthetic resins and compositions containing the same. More especially it involves the manufacture of vinyl resins and compositions wherein certain stabilizing agents are incorporated, preferably during formation of the resin or composition, for the purpose of rendering them stable toward heat and light, and of preventing or retarding the destruction of those valuable properties of the resins adapting them for their ordinary commercial uses.

Many methods are already well known for the production of resinous bodies by the partial or complete polymerization of a vinyl compound or of a mixture of two or more vinyl compounds. Such resins and compositions containing the same have a wide field of usefulness in the production of lacquers, paints, varnishes, adhesives, and other coating and impregnating compositions. They also may be employed in the solid state as the bases for molding compounds and plastic compositions of various kinds.

The vinyl resins produced by processes in use prior to this invention generally have possessed the objectionable property of being relatively unstable to heat and/or light, particularly to sunlight. Therefore, such resins and the compositions containing them frequently tend gradually to discolor in the course of the heat treatment required for molding them or for incorporating them into liquid coating compositions, or they develop color subsequent thereto during exposure of the same to natural or artificial light and heat in the ordinary course of their use.

The present invention is based upon the discovery that resinous polymerization products of the nature of those described may have their stability toward heat and light greatly increased by the incorporation therein, either during their manufacture or subsequent thereto, of small amounts of certain metallic organic compounds, especially of metal soaps of saturated, unsaturated and substituted fatty acids, such as the stearates, oleates, linoleates, ricinoleates, palmitates, abietates, oxidized linoleates and ricinoleates, acetylated ricinoleates, and laurates of the alkaline earth metals, the alkali metals, cadmium, lead, manganese and antimony.

Among the most effective of these stabilizers are the lead, manganese, cadmium, and alkaline-earth salts of the above-mentioned fatty acids. However, the corresponding metal salts of other fatty acids and of other weak organic acids also function very satisfactorily for increasing the heat- and light-stability of these resins. Among such compounds may be mentioned basic lead carbonate, barium succinate, cadmium palmitate, calcium lactate, calcium lacto-phosphate, lead adipate, lead benzoate, lead tartrate, lead and manganese palmitates, sodium abietate, and lead acetate.

Some of these compounds are slightly superior to others in their ability to impart to resins containing them resistance to discoloration by sunlight. This ability bears no relation to the properties of these compounds as heat-stabilizers.

The soaps of certain metals, such as copper oleate, do not function satisfactorily as heat stabilizers for these resins, but serve, however, to increase the light-resistance of the resins, even when used in minute amounts, in unstabilized resins or in those resins stabilized against deterioration by heat with heat-stabilizing soaps or their equivalent for the purpose.

Those metal soaps or salts which are particularly effective are easily dispersed or dissolved in the molten or plastic vinyl resin, or in a solution or dispersion thereof in a solvent such as toluene or acetone.

The cadmium soaps, while as a rule somewhat less effective as heat-stabilizers for preventing discoloration of the resin than are the corresponding lead soaps, are highly satisfactory for the purpose, and are usually preferred to calcium soaps. The metal laurates also generally are effective, as are the corresponding metal salts of most of the weak acids. The manganese soaps are strongly resistant to discoloration by heat but are somewhat colored themselves.

The metallic soaps and salts of weak organic acids of the present invention definitely retard the liberation of hydrogen chloride that is associated with resin decomposition and discoloration. These stabilizers preferably are substantially neutral or slightly basic, although the resin mixture may be rendered more alkaline, when desired, by the introduction of free alkaline oxides, hydrates or other alkaline compounds.

It is probable that as the resin develops any tendency toward decomposition, accompanied by the formation of an acid, the stabilizing soap present correspondingly is reactive therewith to neutralize the acid, as well as its effect upon the resin.

The metal soaps employed may be in the nature of oxidized, acetylated or other soaps, such as those prepared by reacting a solution of a salt of the metal and a water-soluble soap derived from an oxidized or blown linseed oil, blown castor oil, or an acetylated ricinoleate. Superior light-stabilizing effects are obtained by soaps of these blown or oxidized oils.

The stabilizing compounds of the present invention, although particularly adapted for the heat-stabilization of polymerized resins, also possess light-stabilization properties in varying degree. Therefore, they often may be used advantageously in conjunction with other soaps, esters, or other stabilizing substances for that purpose. Where certain esters, such as butyl salicylate or methyl salicylate, are incorporated in vinyl resins for light-stabilization of the latter, there sometimes may be produced in the resin a slight bluish haze. The introduction of very small amounts of a soap or organic salt of the present invention, such as strontium oleate and/or sodium oleate, facilitates the production of a clear resin.

Certain light-stabilizers such as urea are sometimes difficult to disperse properly in vinyl resins. The addition of as small an amount as .1% or less of a sodium or other alkali metal soap, such as the oleate, stearate, linoleate, or ricinoleate, effectively disperses the urea in the resin, while preserving the light-stabilizing effect of the former.

The light-stabilizing action of certain metal soaps of the present invention which are especially selected for heat-stabilization, may be greatly improved by the addition to the resin of even extremely small amounts, less than .1%, of certain metal soaps not themselves suitable heat-stabilizers. In one instance, a vinyl resin that had been stabilized toward heat by the addition of 1% of lead oleate, had its stability toward sunlight substantially doubled by the addition thereto of .01% of copper oleate, although the latter has little, if any, heat-stabilizing action.

The soaps may be added to the resin in the form of a mixed soap, such as mixed cadmium-lead stearates, or a mixture of lead oleate and stearate; or the respective soaps may be introduced into the resin successively.

The stabilizing agent may be uniformly incorporated with the polymerization product to be stabilized in any suitable manner that insures an intimate mixture of these materials. Preferably this is effected by mixing the dry resin and stabilizer in a masticator or on heated differential rolls. Proper mixing generally may be secured within fifteen minutes or less on rolls heated to from around 100° C. to around 110° C.

The stabilizer may also be incorporated in the resin in the presence of acetone or other suitable solvent, or in the presence of a fluid non-solvent for the resin. In such case the metal soap preferably is dissolved or dispersed in the solution or dispersion of the resin, and the resin and stabilizer are then precipitated in intimate admixture by introducing water into the solution. The wet precipitate (generally after washing with water), may be dried in a drier or on differential rolls heated to around 110° C. to 115° C. A vinyl resin produced by the conjoint polymerization of a mixture containing 85% vinyl chloride and 15% vinyl acetate and stabilized in the wet way mentioned above with .8% of alkaline calcium stearate showed no darkening after several months exposure to light.

The amount of stabilizer employed may vary within rather wide limits, depending upon the nature of the stabilizer and the physical and chemical properties of the polymerization product to be stabilized. An amount of the stabilizer within the range from .5% and 3% of the weight of the product to be stabilized, and generally around 1% thereof, provides satisfactory stabilization, while preserving the desirable physical properties of the product. These soaps or salts may be employed in the resins in amounts greater than 3%. Under such conditions they may also function as plasticizers, and for modifying the hardness, toughness and other physical properties of the resin or resinous composition. Even when used in the smaller amounts named above, the soaps exert a slight plasticizing action, and they also serve as lubricants, facilitating the ready processing of the resin and the easy removal thereof from molds, calender rolls, and the like.

Among the polymerization products especially adapted to be stabilized against the action of heat and/or light by the present invention are those produced by the more or less complete polymerization of vinyl halides, and of mixtures of vinyl halides and vinyl esters of aliphatic acids, or by the conjoint polymerization of mixtures of such compounds. Preferred resins of the latter type may be prepared from mixtures of vinyl chloride and vinyl acetate, containing from about 60% to about 95% of vinyl chloride. These resins may have incorporated therein the usual plasticizers, fillers, and coloring materials.

The following examples will illustrate the invention:

*Example 1*

A plastic mass of a vinyl resin formed by the conjoint polymerization of a mixture of about 85% vinyl chloride and about 15% vinyl acetate, which had been precipitated with water from an acetone solution of the resin, had intimately incorporated therein 1% of its weight of lead oleate produced by reacting 2 mols of oleic acid with 1 mol. of litharge. A somewhat lighter grade of lead oleate especially adapted for the stabilization of these resins may be made by reacting one mol. of lead acetate with 2 mols of sodium oleate in water solution, followed by the washing of the resultant lead oleate, first with water and then with methanol. The lead oleate was milled into the resin on differential rolls heated to 100° C., yielding a clear, pale amber product, many times as resistant to a heat of around 125° C. and higher, and to the action of light as is the same resin when unstabilized. The resin retained its valuable properties of toughness and elasticity, and was free from objectionable brittleness under normal conditions of its use.

*Example 2*

A vinyl resin produced by the conjoint polymerization of a mixture of about 85% of vinyl chloride and about 15% of vinyl acetate had 1% of its weight of cadmium laurate milled into it over a period of fifteen minutes on rolls heated to 100° C. The milled resin mixture was a very pale amber color, and was many times as resistant to prolonged exposure to a temperature of 125° C. as was the same resin unstabilized. It was also resistant to the action of sunlight.

*Example 3*

100 parts by weight of the refined vinyl resin remaining after the extraction with toluol and acetone of a vinyl resin similar to that set out in Example 2, was milled with 2 parts of lead stearate, .02 part of ultramarine blue, and .50 part of titanium dioxide, under conditions like those named in Example 2. The resultant resin was stable toward light and to heat applied to the resin in subsequent molding operations during utilization of the resinous product.

Decomposition actually occurring within an unstabilized resin such as a polymerized vinyl chloride resin, may be definitely stopped and the color of the resin definitely improved so as to yield a much lighter product by milling therein around 1% or more of calcium stearate or other stabilizer of the present invention, even while the same is exposed to elevated temperatures as high as 140° C. or higher. The calcium stearate employed may be rendered somewhat alkaline with calcium hydroxide.

By the practice of the present invention bodies and coatings of vinyl resins can be produced which are suitably strong, hard, and tenacious to adapt them for the usual commercial uses for these resins, and which resins are highly resistant to the destructive action of heat and light.

The invention is susceptible of modification within the scope of the appended claims.

We claim:

1. A heat- and light-resistant polymerization product of at least one vinyl ester, including a vinyl halide, which product contains a small amount of a metal soap having a metallic radical selected from the group of metals consisting of the alkali metals, the alkaline earth metals, cadmium, lead and manganese.

2. A heat- and light-resistant polymerization product of at least one vinyl ester, including a vinyl halide, which product contains from about ½% to around 3% of a metal soap having a metallic radical selected from the group of metals consisting of the alkali metals, the alkaline earth metals, cadmium, lead and manganese.

3. A heat- and light-resistant polymerization product of at least one vinyl ester, including a vinyl halide, which product contains a small amount of a mixture of metal soaps, including a lead soap and a metal soap adapted to still further increase the light-stability of the said product.

4. A heat- and light-resistant polymerization product of at least one vinyl ester, including a vinyl halide, which product contains a small amount of a mixture of metal soaps including a lead soap, and a copper soap adapted to increase further the light-stability of the said product.

5. Process of producing heat- and light-resistant resinous polymerization products of vinyl esters, which comprises intimately mixing a polymerization product of at least one vinyl ester, including a vinyl halide, and a small amount of a metal salt of a weak organic acid having its metal radical selected from the group of metals consisting of the alkali metals, the alkaline earth metals, cadmium, lead, and manganese, and having its acid radical selected from the group consisting of stearic acid, oleic acid, linoleic acid, ricinoleic acid, lauric acid, palmitic acid, abietic acid, oxidized linoleic acid, acetylated ricinoleic acid and oxidized ricinoleic acid.

6. Process of producing heat- and light-resistant resinous polymerization products of vinyl esters, which comprises intimately mixing a polymerized vinyl ester and a small amount of a metal soap having its metal radical selected from the group of metals consisting of lead, manganese, cadmium, the alkali metals, and the alkaline earth metals, and having its acid radical selected from the group consisting of stearic acid, oleic acid, linoleic acid, ricinoleic acid, lauric acid, palmitic acid, abietic acid, oxidized linoleic acid, acetylated ricinoleic acid, and oxidized ricinoleic acid.

7. Process of dispersing a light-stabilizing organic compound in a resinous polymerization product of at least one vinyl ester, including a vinyl halide, while concurrently improving the heat stability of the product, which comprises mixing with the latter and the said compound at an elevated temperature a small amount of an alkali metal soap.

8. Process of producing heat- and light-resistant resinous polymerization products of vinyl esters, which comprises intimately mixing together a polymerized vinyl ester and a small amount of a heat-stabilizing compound of a metal selected from the group consisting of lead, calcium, manganese, the alkali metals, and the alkaline earth metals, with a weak organic acid selected from the group consisting of stearic acid, oleic acid, ricinoleic acid, linoleic acid, lauric acid, palmitic acid, abietic acid, oxidized linoleic acid, acetylated ricinoleic acid and oxidized ricinoleic acid, and further mixing with the said vinyl compound less than .1% of its weight of a copper soap.

9. Process of producing heat- and light-resistant resinous polymerization products of vinyl esters, which comprises dispersing a metal soap in a solution of a polymerization product of at least one vinyl ester in a water-soluble organic solvent, co-precipitating the said product and the metal soap in intimate intermixture, washing the precipitated resin, and drying the same, the said soap having its metallic radical selected from the group of metals consisting of lead, manganese, cadmium, the alkali metals, and the alkaline earth metals, and having its acid radical selected from the group consisting of stearic acid, oleic acid, linoleic acid, ricinoleic acid, lauric acid, palmitic acid, abietic acid, oxidized linoleic acid, oxidized ricinoleic acid, and acetylated ricinoleic acid.

10. A heat- and light-resistant polymerization product of at least one vinyl ester, including a vinyl halide, which product contains a small amount of at least one metal soap having a metallic radical selected from the group consisting of the alkali metals, the alkaline earth metals, cadmium, lead and manganese, and having its acid radical selected from the group consisting of stearic acid, oleic acid, ricinoleic acid, linoleic acid, lauric acid, palmitic acid, abietic acid, oxidized linoleic acid, oxidized ricinoleic acid and acetylated ricinoleic acid.

11. A heat- and light-resistant polymerization product of at least one vinyl ester, including a vinyl halide, which product contains an ester adapted to increase the stability of the said product toward light, and a heat-stabilizing metal soap having a metallic radical selected from the group consisting of the alkali metals, the alkaline earth metals, cadmium, lead, and manganese, and having its acid radical selected from the group consisting of stearic acid, oleic acid, ricinoleic acid, linoleic acid, lauric acid, palmitic acid, abietic acid, oxidized linoleic acid, oxidized ricinoleic acid and acetylated ricinoleic acid.

12. A heat- and light-resistant polymerization product of at least one vinyl ester, including a vinyl halide, which product contains butyl salicylate, adapted to increase the stability of the said product toward light, and a small amount of a heat-stabilizing metal soap having a metallic radical selected from the group consisting of the alkali metals, the alkaline earth metals, cadmium, lead and manganese, and having its acid radical selected from the group consisting of stearic acid, oleic acid, ricinoleic acid, linoleic acid, lauric acid, palmitic acid, abietic acid, oxdized linoleic acid, oxidized ricinoleic acid and acetylated ricinoleic acid.

MARION C. REED.
FRAZIER GROFF.

CERTIFICATE OF CORRECTION.

Patent No. 2,075,543.

March 30, 1937.

MARION C. REED, ET AL.

It is hereby certified that error appears in the printed specification of the above numbered patent requiring correction as follows: Page 3, second column, lines 18 and 19, claim 8, for the word "calcium" read cadmium; and that the said Letters Patent should be read with this correction therein that the same may conform to the record of the case in the Patent Office.

Signed and sealed this 11th day of May, A. D. 1937.

(Seal)

Henry Van Arsdale
Acting Commissioner of Patents.

said product toward light, and a small amount of a heat-stabilizing metal soap having a metallic radical selected from the group consisting of the alkali metals, the alkaline earth metals, cadmium, lead and manganese, and having its acid radical selected from the group consisting of stearic acid, oleic acid, ricinoleic acid, linoleic acid, lauric acid, palmitic acid, abietic acid, oxdized linoleic acid, oxidized ricinoleic acid and acetylated ricinoleic acid.

MARION C. REED.
FRAZIER GROFF.

CERTIFICATE OF CORRECTION.

Patent No. 2,075,543.

March 30, 1937.

MARION C. REED, ET AL.

It is hereby certified that error appears in the printed specification of the above numbered patent requiring correction as follows: Page 3, second column, lines 18 and 19, claim 8, for the word "calcium" read cadmium; and that the said Letters Patent should be read with this correction therein that the same may conform to the record of the case in the Patent Office.

Signed and sealed this 11th day of May, A. D. 1937.

(Seal)

Henry Van Arsdale
Acting Commissioner of Patents.

CERTIFICATE OF CORRECTION.

Patent No. 2,075,543. March 30, 193

MARION C. REED, ET AL.

It is hereby certified that error appears in the printed specificati of the above numbered patent requiring correction as follows: Page 3, second column, lines 18 and 19, claim 8, for the word "calcium" read cadmium; and that the said Letters Patent should be read with this correction therein that the same may conform to the record of the case in the Patent Office.

Signed and sealed this 11th day of May, A. D. 1937.

(Seal)

Henry Van Arsdale
Acting Commissioner of Patent